UNITED STATES PATENT OFFICE.

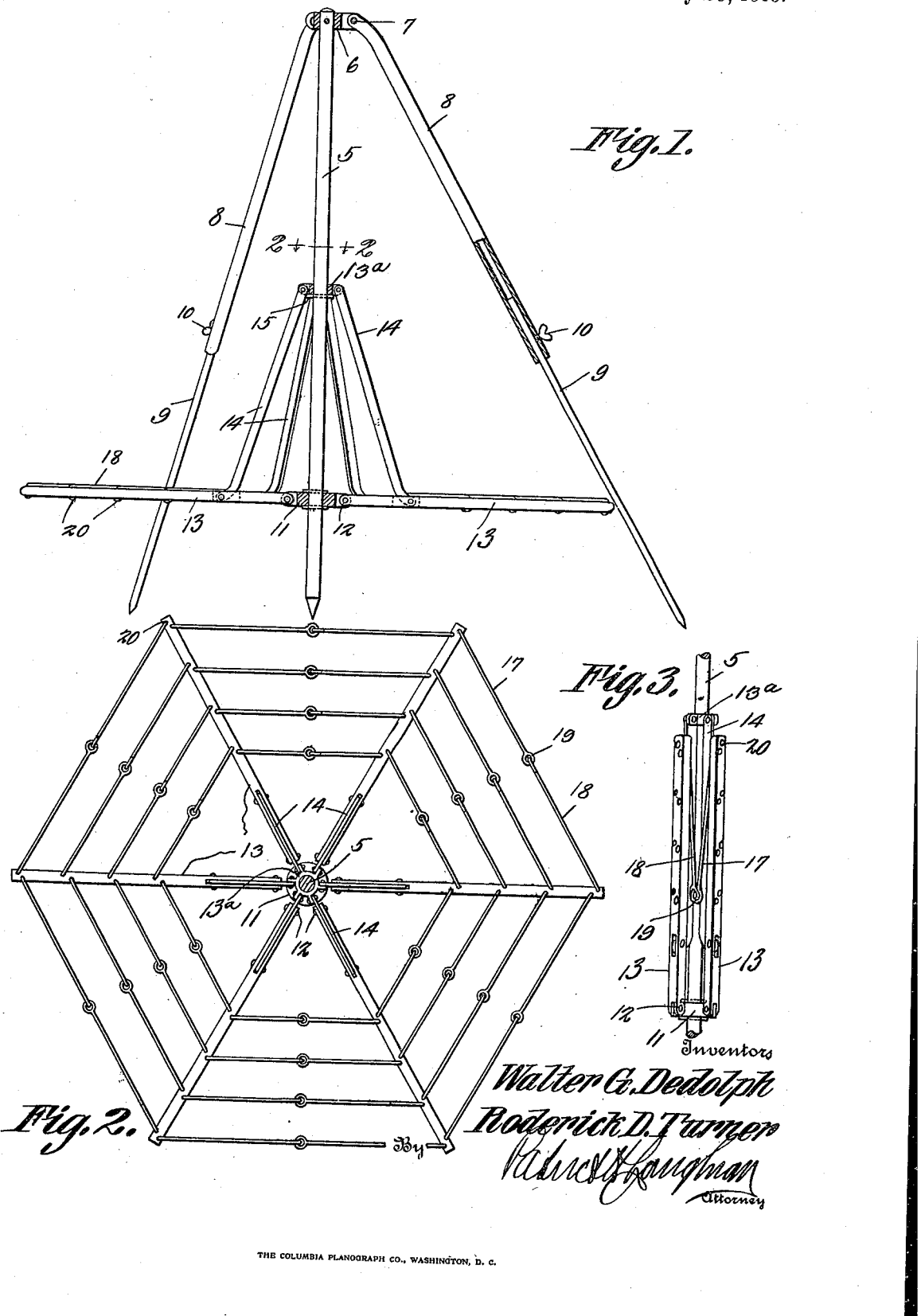

RODERICK D. TURNER AND WALTER G. DEDOLPH, OF MOUNT VERNON, WASHINGTON.

CAMP-STOVE.

1,311,302. Specification of Letters Patent. Patented July 29, 1919.

Application filed February 19, 1919. Serial No. 277,995.

*To all whom it may concern:*

Be it known that we, RODERICK D. TURNER and WALTER G. DEDOLPH, citizens of the United States, residing at Mount Vernon, in the county of Skagit and State of Washington, have invented certain new and useful Improvements in Camp-Stoves, of which the following is a specification.

This invention relates to stoves for open air use, consisting of a support for holding cooking utensils over a fire built upon the ground.

The invention has for its object to provide a novel and improved support in the nature of a tripod frame which is adjustable as to height, and also foldable into small and compact form for convenience in transportation, the device being designed more particularly for automobile tourists, campers, etc.

The object stated is attained by means of a combination and arrangement of parts to be hereinafter described and claimed, and in order that the same may be better understood, reference is had to the accompanying drawing, forming a part of this specification.

In the drawing—

Figure 1 is an elevation of the device, partly in section; Fig. 2 is a horizontal section on the line 2—2 of Fig. 1, and Fig. 3 is an elevation of a fragment of the device folded.

Referring specifically to the drawing 5 denotes a post or rod which is pointed at one end so that it may be driven into the ground in vertical position similar to a stake. To the other end of the post is fixed a sleeve 6 having ears to which are pivoted, as shown at 7, tripod legs composed each of two telescopically connected sections 8 and 9, respectively, so that they may be adjusted as to length, the sections being locked in adjusted position by a clamping screw 10. The tripod legs will be adjusted to extend at an inclination from the top of the post to the ground, into which latter the lower sections 9 of the legs may be stuck, their extremities being pointed to facilitate this.

On the post 5, near its lower end, is rotatably mounted a collar 11 to which is pivoted, as shown at 12, a series of grate supporting bars 13 adapted to be horizontally positioned and to extend radially from the post.

Above the collar 11, a runner sleeve 13$^a$ is slidably and rotatably mounted on the post 5 and connected by stretcher links 14 to the bars 13, said links being pivotally connected to the runner and to the bars. It will therefore be seen that when the runner 13$^a$ is slid upwardly on the post 5, the bars 13 are folded inward and upward to lie closely alongside the post as shown in Fig. 3, and upon sliding the runner downwardly on the post, the bars are swung down into horizontal position and to project radially from the post. It will be obvious that the parts operate similarly to the ribs and stretchers of an umbrella. Downward movement of the runner 13$^a$ on the post 5 is limited by a stop pin 15 on the latter, this pin determining the position of the runner when the bars 13 are in horizontal position.

The grate bars extend transversely between the bars 13, they being connected at their ends to two adjacent bars. The grate bars are wire rods which are in two sections, as shown at 17 and 18, respectively, the two sections being pivotally connected by having their adjacent ends linked together as shown at 19. The connections between the rod sections and the bars 13 are also loose ones, the bars having apertures into which the ends of the rod sections loosely seat, and they are prevented from pulling out by being headed or beaded as shown at 20.

There is sufficient play in the linked ends 19 of the rod sections 17 and 18 to allow them to fold between the bars 13 when the latter are folded alongside the post 5, as shown in Fig. 3, and as the tripod legs are also foldable inwardly to lie close to the post, the entire structure can be reduced to small and compact form for convenience in storage and transportation. The device can be easily set up for use, and it can, with equal facility, be taken down and folded. Adjustment as to height to position the bars 13 and the grate rods carried by the latter the desired distance from the ground, is readily made by setting the tripod legs.

The entire structure consisting of collar 11, runner 13$^a$, bars 13, stretcher links 14, and grate bars 17, 18, is revoluble around post 5 as may be required when cooking.

We claim:

A camp stove comprising a post, radially extending grate-supporting bars pivotally connected to the post above the lower end thereof and foldable alongside the post, a runner slidably and rotatably mounted on the post above the grate-supporting bars, link connections between the runner and the bars for effecting the unfolding and folding of the latter, grate bars carried by the aforesaid supporting bars, said grate bars extending transversely between two adjacent supporting bars and being loosely connected thereto, and composed of pivotally connected sections to fold between said adjacent bars when the latter are folded alongside the post, and foldable supporting legs pivoted to the post above the runner and positioned beyond the outer ends of the grate-supporting bars.

In testimony whereof we affix our signatures.

RODERICK D. TURNER.
WALTER G. DEDOLPH.